United States Patent
Ewald et al.

[15] 3,692,039
[45] Sept. 19, 1972

[54] CHARGING VALVE

[72] Inventors: Jerome T. Ewald; Lloyd G. Bach; Richard L. Lewis, all of South Bend, Ind.

[73] Assignee: The Bendix Corporation

[22] Filed: Dec. 21, 1970

[21] Appl. No.: 99,796

[52] U.S. Cl. .................137/118, 137/115, 137/489
[51] Int. Cl. ............................................G05d 16/10
[58] Field of Search...137/118, 115, 116.3, 461, 489, 137/614, 119

[56] References Cited

UNITED STATES PATENTS

| | | | |
|---|---|---|---|
| 3,575,192 | 4/1971 | MacDuff | 137/116.3 |
| 3,011,506 | 12/1961 | Schwartz | 137/118 |
| 3,393,945 | 7/1968 | Reichard | 137/118 |
| 2,622,611 | 12/1952 | Stark | 137/490 |

*Primary Examiner*—M. Cary Nelson
*Assistant Examiner*—William H. Wright
*Attorney*—Ken C. Decker and Plante, Hartz, Smith & Thompson

[57] ABSTRACT

A charging valve is disclosed which controls flow of fluid into an accumulator used with a closed center hydraulic brake booster in a vehicle hydraulic system. The charging valve includes a back pressure producing device which creates a fluid pressure level within the charging valve sufficiently high to charge the accumulator while permitting sufficient fluid flow through the charging valve to operate the power steering gear of the vehicle. A shutoff valve is provided in the passage between the inlet of the charging valve and the accumulator. A second valve within the housing maintains the shutoff valve open as long as the fluid pressure level in the accumulator is below a predetermined value, but permits the shutoff valve to close when the fluid pressure level in the accumulator attains the predetermined value. The second valve also operates the back pressure producing device which restricts fluid flow between the inlet and the outlet when the fluid pressure level in the accumulator is below the predetermined value, but permits substantially unrestricted flow between the inlet and outlet of the charging valve when the fluid pressure level in the accumulator attains the predetermined value.

7 Claims, 2 Drawing Figures

PATENTED SEP 19 1972  3,692,039

INVENTORS
JEROME T. EWALD
LLOYD G. BACH
BY  RICHARD L. LEWIS
Ken C. Decker
ATTORNEY 3,692,039

CHARGING VALVE

BACKGROUND OF THE INVENTION

Because of their smaller size and lower weight, hydraulic brake boosters are expected to be used in lieu of existing vacuum boosters in vehicles having power-assisted brakes in the near future. One advantage of the so-called "closed-center" brake booster is that pressurized fluid may be stored in the accumulator used in the vehicle hydraulic system to provide a number of powered brake applications even after the vehicle engine ceases to operate. To provide control over the accumulator pressure level while simultaneously providing sufficient flow to the vehicle's power steering gear to operate the latter, an accumulator charging valve must be provided. A typical charging valve is disclosed in U.S. Pat. No. 2,977,761 owned by the assignee of the present invention and incorporated herein by reference. The aforementioned patent discloses the charging valve as part of a full power brake valve, but of course the charging valve portion could be made in a separate housing. However, a difficulty with this and other prior art charging valves is that the accumulator is charged to a pressure level equal to that at the inlet of the charging valve, regardless of how high this pressure may be. Obviously, it is desirable to terminate charging of the accumulator at some predetermined pressure level to prevent the accumulator from being damaged.

SUMMARY OF THE INVENTION

Therefore, an important object of our invention is to provide an accumulator charging valve that assures that the accumulator is fully charged at all times while permitting sufficient flow of fluid through the charging valve to operate the power steering gear of the vehicle.

Another important object of our invention is to provide a charging valve that terminates charging of the accumulator at some predetermined pressure level, independent of the fluid pressure level at the inlet of the charging valve.

A further important object of our invention is to simplify the design of the back pressure producing device used in our accumulator, to thereby simplify and reduce the cost of the charging valve.

DRAWING DESCRIPTION

FIG. 1 is a schematic illustration of a vehicle hydraulic system of the type utilizing the charging valve made pursuant to the teaching of our present invention; and FIG. 2 is a cross sectional view of the charging valve illustrated schematically in FIG. 1.

DETAILED DESCRIPTION

Figure 1:
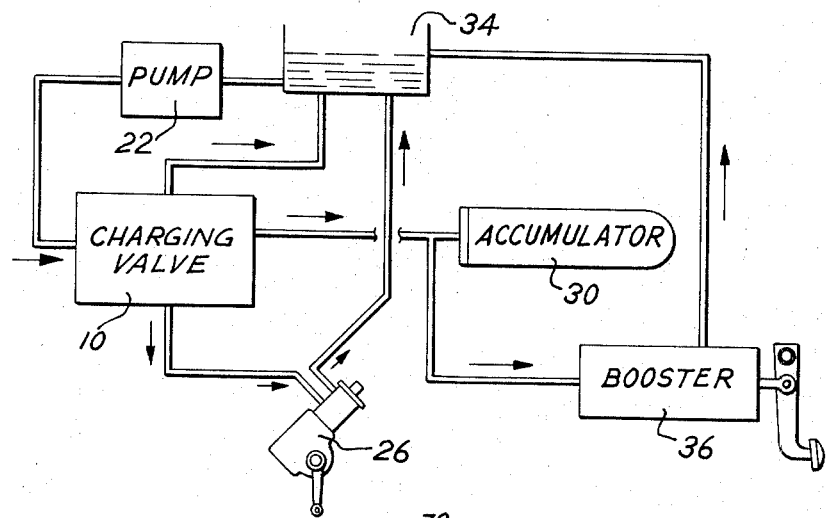

Referring now to the drawing, a charging valve indicated generally by the numeral 10 includes a housing 12 dividing a first bore 14, a second bore 16, and a third bore 18 therewithin. An inlet 20 communicates the bore 14 with the outlet or high pressure side of the vehicle's power steering pump 22, an outlet 24 communicates the bore 14 with the inlet of the vehicle's power steering gear 26. A fluid port 28 communicates the bore 16 with an accumulator 30, and another port 32 communicates the bore 18 with the fluid reservoir 34 of the vehicle's hydraulic system. The inlet of a hydraulic brake booster indicated generally by the numeral 36 is communicated with the accumulator 30, and the drain port of the booster 36 is communicated to the reservoir 34, as is the drain port of the power steering gear 26. The brake booster 36 may be of any suitable closed center design, such as the one disclosed in co-pending U. S. Pat. application Ser. No. 73,934, owned by the assignee of the present invention and incorporated herein by reference. The inlet of the pump 22 is also communicated with the reservoir 34.

A back pressure producing device generally indicated by the numeral 38 is provided in the bore 14 in order to assure a sufficiently high fluid pressure level at the inlet 20 to charge the accumulator 30. Back pressure producing device 38 includes a piston 40 which is urged toward a valve seating area 42 on the wall of the bore 14 by a spring 44. In this position, the piston 40 cooperates with the valve seating area 42 to define an orifice therebetween, which restricts flow of fluid between the inlet 20 and the outlet 24. As can be seen from the drawings, the piston 40 divides the bore 14 into a first chamber 46 and a second chamber 48. A passage 50 communicates the chamber 46 with the bore 16. A filter 52 is disposed within the chamber 46 and removes extraneous matter from the fluid flowing into the passage 50. A check valve 53 is provided in the passage 50 to prevent return flow of fluid from the bore 16 into the chamber 46.

Valve means generally indicated by the numeral 54 is provided within the bore 16 and includes a valve seat 56 provided on the wall of the bore 16, a valve head 58 which cooperates with the seat 56 which regulates the flow of fluid between the passage 50 and the port 28, and a valve operating piston 60 secured to the valve head 58 which is slidably mounted in the bore 16, dividing the latter into a first compartment 62 and a second compartment 64. A spring 66 yieldably urges the valve head 58 away from the seat 56.

Valve mechanism generally indicated by the numeral 68 is provided in the bore 18. Valve mechanism 68 includes an annular member 70 defining a bore 72 therewithin having valve seats 74 and 76 on opposite ends thereof. The annular member 70 divides the bore 18 into a first compartment 78 communicated with the port 28 by passage 80, and a second compartment 82 which is communicated with the reservoir 34 by port 32. The outer circumferential surface of the annular member 70 is grooved to define an annulus 84 between the member 70 and the wall of the bore 18 which is communicated with the bore 72 by the passage 86. A passage 88 communicates the annulus 84 with the compartment 64 and with the chamber 48. A piston 90 is slidably mounted in the bore 72 but sufficient clearance is provided between the piston and the wall of the bore 72 to permit fluid to flow past the piston 90 and into the passage 86. Spheres 92 and 94 are carried on opposite ends of the piston 90, but the latter is long enough so that one of the spheres 92 or 94 is maintained off their corresponding seat 74 or 76 at all times. Springs 96 and 98 yieldably urge their corresponding spheres 92, 94 toward the corresponding seat 74 and 76. However, since the spring 98 is much stronger than the spring 96, sphere 94 is normally engaged with the seat 76 while the sphere 92 is usually spaced from its seat 74, to permit flow of fluid from the compartment 78 into the annulus 84, but preventing flow of fluid into the chamber 82.

MODE OF OPERATION

Figure 2:
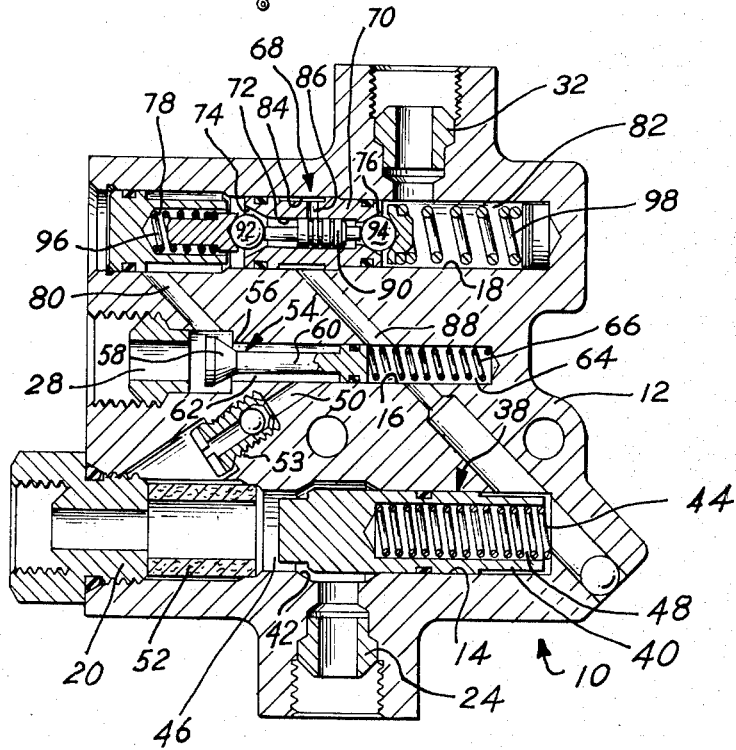

FIG. 2 illustrates the various components of the charging valve 10 in the positions they assume when the accumulator 30 is discharged. In this condition, spring 44 maintains the piston 40 in fluid metering relationship with the valve seating area 42, spring 66 maintains the valve head 58 off the seat 56, and spring 98 urges the sphere 94 into engagement with the seat 76 and maintains the sphere 92 off the seat 74. When the vehicle's engine is started the pump 22 forces fluid into the inlet 20. Since the piston 40 defines a flow restrictive orifice with the valve seating area 42, a higher fluid pressure level is established in that portion of the chamber 46 to the left of the valve seating area 42 than at the outlet 24. Therefore, a portion of the fluid flowing into the inlet 20 is forced into the passage 50, and the remainder of the fluid flowing into the inlet 20 flows past the valve seating area 42 and out of the outlet 24. Fluid in the passage 50 flows past the check valve 53, into the compartment 62, past the valve head 58, and out of the port 28 to the accumulator 30. As the pressure level in the accumulator 30 increases fluid is communicated to the chamber 78 through the passage 80. Fluid in the chamber 78 flows past the sphere 92 into the bore 72, through the passage 86, and into the annulus 84. Fluid in the annulus 84 is communicated into the compartment 64 and into the chamber 48 by the passage 88. Since the fluid pressure level in the chamber 48 is substantially equal to the fluid pressure level in the accumulator 30, the fluid pressure level in the chamber 46 will always exeed the fluid pressure level in the chamber 48 by an amount equal to the force of the spring 44. If the fluid pressure level in the chamber 46 should be well below that in the chamber 48 the spring 44 will urge the piston 40 into momentary engagement with the valve seating area 42. Since the flow rate of fluid into the inlet 20 is substantially constant, the fluid pressure level in the chamber 46 will immediately increase to an amount sufficient to restore equilibrium to the piston 40. Therefore, since the fluid pressure level in the chamber 46 exceeds the fluid pressure level in the accumulator 30 at all times when the pump is operating and while the accumulator is being charged, a steady flow of fluid through the passage 50 past the valve head 58 into the accumulator 30 is assured.

As noted above, fluid pressure from the accumulator 30 is communicated into the chamber 78 through the passage 80. Therefore, when the fluid pressure level in the accumulator reaches the predetermined value such that the fluid pressure level in the chamber 78 is high enough to overcome the force of the spring 98, the sphere 92 will be urged into engagement with the seat 74, thereby terminating fluid communication between the chamber 78 and the annulus 84. Furthermore, sphere 94 will be urged off of the seat 76 to vent the annulus 84 to the reservoir 34 through the chamber 82 and the port 32. Since the compartment 64 and the chamber 48 are communicated with the annulus 84, they too, will be vented to the reservoir 34 when the fluid pressure level of the accumulator 30 reaches the predetermined value. Since the fluid in the reservoir 34 is at atmospheric pressure, the fluid pressure level in the chamber 48 is immediately reduced to a level far below that in the chamber 46, permitting the high pressure fluid in the latter to force the piston 40 to the right viewing FIG. 2, away from the valve seating area 42, to permit substantially uninhibited flow of fluid between the inlet 20 and the outlet 24. Of course, the compartment 64 is also vented to reservoir pressure at this time. Therefore, the high pressure fluid in the accumulator 30 acting against the valve operating piston 60 forces the valve head 58 into sealing engagement with the valve seat 56, thereby preventing flow of fluid into the accumulator 30. Prior art charging valves sometimes permitted further charging of the accumulator even when the latter was charged to its design pressure. As is evident to those skilled in the art, this cannot happen when the charging valve made pursuant to the teachings of our present invention is used. Even though the fluid pressure level entering the inlet 20 should become higher than the pressure in the accumulator such that a portion of the fluid might flow into the passage 50, the fluid can not flow past the valve seat 56 when the accumulator is charged to its maximum design pressure.

We claim:

1. In an accumulator charging valve:

a housing having an inlet, an outlet, and passage means communicating the inlet with an accumulator;

back pressure producing means within said housing between the inlet and outlet for controlling the fluid pressure level at said inlet;

said back pressure producing means increasing the fluid pressure level at said inlet as the pressure level in the accumulator increases until the fluid pressure level in the latter attains a predetermined value whereupon said back pressure producing means permits substantially unimpeded flow of fluid between the inlet and the outlet; and valve means within said passage means, said valve means closing to prevent further flow of fluid into said accumulator after the fluid pressure level in the latter attains said predetermined value;

said housing defining a bore therewithin communicating said inlet, said outlet and said passage means;

said back pressure producing means including a piston slidably mounted in said bore dividing the latter into a first chamber communicating the inlet, the outlet and the passage means and a second chamber, an annular valve seating area in said first chamber, said piston being urged into a position cooperating with said valve seating area to restrict flow of fluid between the inlet and outlet when the fluid pressure level in said accumulator is below said predetermined value, said piston moving away from said valve seating area to permit substantially unrestricted flow of fluid between the inlet and the outlet when the fluid pressure level in the accumulator attains said predetermined value; and a valve mechanism within said housing shiftable from a first condition communicating said second chamber with the accumulator to permit fluid pressure from the accumulator to maintain said piston in a position restricting flow of fluid through said first chamber, said valve means shifting to a second condition venting said second chamber to a fluid reservoir to permit high pressure fluid in said first chamber to urge said piston away from said valve seating area when the fluid pressure level in the accumulator attains said predetermined value.

2. In an accumulator charging valve:
a housing having an inlet, an outlet, and passage means communicating the inlet with an accumulator;
back pressure producing means within said housing between the inlet and outlet for controlling the fluid pressure level at said inlet;
said back pressure producing means increasing the fluid pressure level at said inlet as the pressure level in the accumulator increases until the fluid pressure level in the latter attains a predetermined value whereupon said back pressure producing means permits substantially unimpeded flow of fluid between the inlet and the outlet; and
valve means within said passage means, said valve means closing to prevent further flow of fluid into said accumulator after the fluid pressure level in the latter attains said predetermined value;
said housing defining first and second bores therewithin;
said inlet, said outlet, and said passage means communicating with one of said bores;
said valve means including a valve operating piston slidably mounted in said second bore adapted to open and close said valve means in response to variations in the fluid pressure level in said accumulator, and resilient means yieldably maintaining said second valve means open;
said valve operating piston dividing said second bore into first and second compartments;
said passage means extending through said first compartment to communicate fluid pressure from said inlet to one face of said valve operating piston;
said second compartment being communicated to the accumulator when the fluid pressure level in the latter is below said predetermined value, thereby creating substantially equal pressures on opposite sides of said valve operating piston to permit said resilient means to maintain said valve means open, said second compartment being vented to reservoir when the fluid pressure in the accumulator attains said predetermined level to permit high pressure fluid from said inlet acting on said one face of said valve operating piston to urge the latter to a position closing said valve means.

3. The invention of claim 2; and
a valve mechanism communicating said second compartment and said back pressure producing means with said accumulator when the fluid pressure level in the latter is below said predetermined value, and communicating said second compartment and said back pressure producing means to the reservoir when the fluid pressure level in the accumulator attains said predetermined level.

4. In an accumulator charging valve:
a housing having an inlet, an outlet, and passage means communicating the inlet with an accumulator;
back pressure producing means within said housing between the inlet and outlet for controlling the fluid pressure level at said inlet;
said back pressure producing means increasing the fluid pressure level at said inlet to thereby communicate pressurized fluid to said accumulator through said passage means;
valve means within said passage means, said valve means including differential pressure responsive means maintaining said valve means open when substantially equal fluid pressures act across said differential pressure responsive means but closing said valve means to prevent communication into said accumulator when a pressure differential exists across said differential pressure responsive means; and
control valve mechanism responsive to the fluid pressure level in said accumulator maintaining substantially equal fluid pressure levels across said differential pressure responsive means when the pressure level in said accumulator is below a predetermined level, said control valve mechanism communicating a pressure differential across said pressure differential responsive means when the pressure level in said accumulator exceeds said predetermined level.

5. The invention of claim 4:
one side of said differential pressure responsive means being communicated to the pressure level in said accumulator, said control valve mechanism communicating the pressure level in said accumulator to the other side of said pressure differential responsive means when the accumulator pressure level is below said predetermined level, but venting said other side of said pressure differential responsive means when said accumulator pressure level exceeds said predetermined level.

6. The invention of claim 4:
said housing defining a bore therewithin;
said pressure differential responsive means including piston means slidable in said bore and defining a pair of chambers between opposite ends of said piston means and corresponding ends of said bore;
one of said chambers being communicated to said passage means and to said accumulator;
said control valve mechanism communicating the other chamber to accumulator pressure when the latter is below said predetermined level, but venting said other chamber when accumulator pressure exceeds said predetermined level.

7. The invention of claim 4:
said valve means including a valve seat within said passage means, and a valve head for engagement with said valve seat to prevent communication into the accumulator, said piston means being operably connected to said valve head.

* * * * *